(12) United States Patent
Han et al.

(10) Patent No.: US 10,438,087 B2
(45) Date of Patent: Oct. 8, 2019

(54) APPARATUS AND METHOD FOR EXTRACTING SALIENT LINE FOR INFORMATION SIGN

(71) Applicant: Electronics and Telecommunications Research Institute, Daejeon (KR)

(72) Inventors: Seung Jun Han, Daejeon (KR); Jeong Dan Choi, Daejeon (KR); Sang Heon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 220 days.

(21) Appl. No.: 15/365,630

(22) Filed: Nov. 30, 2016

(65) Prior Publication Data

US 2017/0255839 A1 Sep. 7, 2017

(30) Foreign Application Priority Data

Mar. 3, 2016 (KR) .................. 10-2016-0025663

(51) Int. Cl.
*G06K 9/46* (2006.01)
*G06T 7/68* (2017.01)
(Continued)

(52) U.S. Cl.
CPC ....... *G06K 9/4671* (2013.01); *G06K 9/00818* (2013.01); *G06K 9/3258* (2013.01);
(Continued)

(58) Field of Classification Search
CPC .. G06K 9/4671; G06K 9/4642; G06K 9/4609; G06K 9/3258; G06K 9/00818; G06T 7/68; G06T 5/006
See application file for complete search history.

(56) References Cited

U.S. PATENT DOCUMENTS

| 2012/0166033 A1 | 6/2012 | Byun et al. |
| 2013/0120575 A1 | 5/2013 | Byun et al. |

FOREIGN PATENT DOCUMENTS

| JP | 2011205436 A | 10/2011 |
| KR | 10-2010-0064140 A | 6/2010 |
| KR | 1020130133513 A | 12/2013 |

OTHER PUBLICATIONS ( Fu, Keren, Irene YH Gu, and Anders CE Ödblom. "Traffic sign recognition using salient region features: A novel learning-based coarse-to-fine scheme." Intelligent Vehicles Symposium. 2015. (Year: 2015).*

(Continued)

*Primary Examiner* — Menatoallah Youssef
(74) *Attorney, Agent, or Firm* — William Park & Associates Ltd.

(57) ABSTRACT

Provided are an apparatus and method for extracting a salient line for an information sign. The apparatus includes an image input portion configured to receive an image including information indication lines to be detected, a signal calculator configured to generate a symmetric function signal consistent with a thickness and a direction of an information indication line having a preset thickness in the received image and perform a convolution of the information indication line and the generated symmetric function signal, a highest value enhancement portion configured to enhance highest values in results of the convolution using a signal quality improvement filter, and a local highest value extractor configured to find local highest values among the enhanced highest values and extract a line connecting the local highest values as a salient line connecting center points in the information indication line.

20 Claims, 13 Drawing Sheets

(a) INPUT IMAGE       (b) EXTRACTION OF SALIENT LINE

(51) Int. Cl.
*G06T 5/00* (2006.01)
*G06K 9/00* (2006.01)
*G06K 9/32* (2006.01)

(52) U.S. Cl.
CPC ......... *G06K 9/4609* (2013.01); *G06K 9/4642* (2013.01); *G06T 5/006* (2013.01); *G06T 7/68* (2017.01)

(56) References Cited

OTHER PUBLICATIONS

Kim, Jaewoong, and Sukhan Lee. "Extracting major lines by recruiting zero-threshold canny edge links along sobel highlights." IEEE Signal Processing Letters 22.10 (2015): 1689-1692. (Year: 2015).*

Jaewoong Kim et al. "Extracting Major Lines by Recruiting Zero-Threshold Canny Edge Links along Sobel Highlights," IEEE Signal Processing Letters, Oct. 2015, pp. 1689-1692, vol. 22, No. 10, IEEE.

Seung-Jun Han et al. "Parking Space Recognition for Autonomous Valet Parking Using Height and Salient-Line Probability Maps," 2015 ETRI Journal, Dec. 1, 2015, ETRI.

* cited by examiner

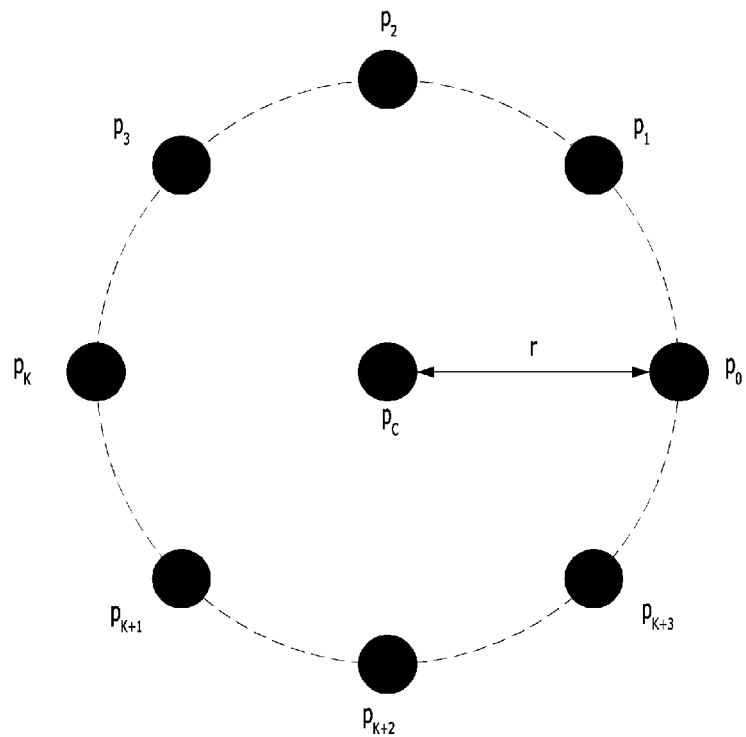

FIG. 10
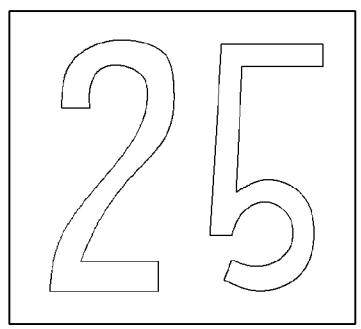 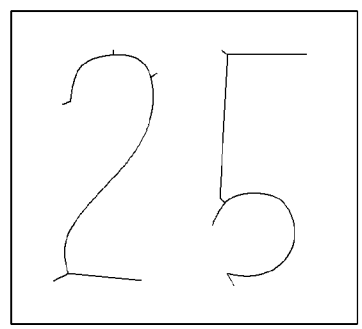
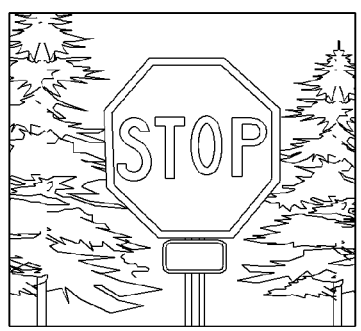 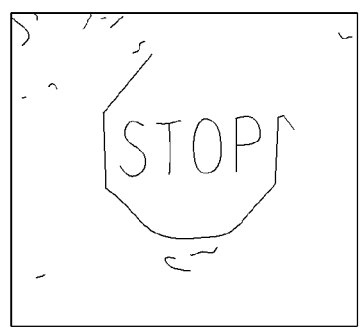
(a) INPUT IMAGE   (b) EXTRACTION OF SALIENT LINE

APPARATUS AND METHOD FOR EXTRACTING SALIENT LINE FOR INFORMATION SIGN

CROSS-REFERENCE TO RELATED APPLICATION

This application claims priority to and the benefit of Korean Patent Application No. 10-2016-0025663, filed on Mar. 3, 2016, the disclosure of which is incorporated herein by reference in its entirety.

BACKGROUND

1. Field of the Invention

The present invention relates to an apparatus and method for extracting a salient line for an information sign, and more particularly, to an apparatus and method for extracting salient lines which are cores of information signs (e.g., road markings, traffic signs, guide signs, etc.) to recognize such information signs.

2. Discussion of Related Art

To recognize information signs, such as road markings, traffic signs, guide signs, etc., a region in which each sign exists is detected, and characteristics of each sign are extracted from the detected region. Then, recognition is performed using these pieces of information.

Existing methods for detecting a region of an information sign, such as a traffic sign, are representatively classified into a method using a color and a method using a shape. The method using a color is a technique of detecting a major color of a sign.

As the method using a shape, there is a method of detecting a major shape, for example, a shape surrounded by a circle or a rectangle, of a sign, and so on. In practice, these two methods are frequently used together. Also, techniques, such as edge detection, gradient detection, etc., are used to detect characteristics in a region for recognizing an information sign.

These existing methods of recognizing an information sign involve multistage processing. In particular, a method that is most frequently used for detection is a sliding window technique. The sliding window technique involves repeating a process of searching an overall input image using a particular mask which is changed in size during the processes.

Accordingly, the sliding window technique shows very low computation speed. Consequently, it is difficult to use the sliding window technique in embedded systems, such as a robot, a driverless car, an auxiliary device for safe driving, a guide device for the blind, and so on.

SUMMARY OF THE INVENTION

The present disclosure is directed to providing an apparatus and method for extracting a salient line for an information sign at a high speed in a way robust to noise such that the apparatus and method may be used in a robot, an auxiliary device for safe driving, etc. having low computational capability.

The present disclosure is also directed to providing an apparatus and method for extracting a salient line for an information sign in which all salient information indication lines existing in an input image are extracted through a single calculation and thus it is possible to detect characteristics (a salient line) of an information sign remarkably rapidly compared to an existing method of recognizing an information sign.

The present disclosure is also directed to providing an apparatus and method for extracting a salient line for an information sign which may be very robust to noise and a change in the thickness of an information indication line for an information sign.

The present disclosure is also directed to providing an apparatus and method for extracting a salient line for an information sign which may be very advantageous for parallel processing because there is no causal relationship between pieces of data for extracting a salient line.

According to an aspect of the present disclosure, there is provided an apparatus for extracting a salient line for an information sign, the apparatus including: an image input portion configured to receive an image including information indication lines to be detected; a signal calculator configured to generate a symmetric function signal consistent with a thickness and a direction of an information indication line having a preset thickness in the received image and perform a convolution of the information indication line and the generated symmetric function signal; a highest value enhancement portion configured to enhance highest values in results of the convolution using a signal quality improvement filter; and a local highest value extractor configured to find local highest values among the enhanced highest values and extract a line connecting the local highest values as a salient line connecting center points in the information indication line.

The signal calculator may generate a disk-shaped symmetric function signal consistent with an arbitrary information indication line having the preset thickness in all directions, and perform a convolution of the information indication line and the generated disk-shaped symmetric function signal.

The signal calculator may generate a pillbox kernel which is a disk-shaped symmetric function defined as a function of image coordinates based on a center of the kernel and a radius of the kernel, and perform a convolution of the information indication line and the generated pillbox kernel.

The signal calculator may approximate the generated pillbox kernel to a value obtained by dividing a sum of image data corresponding to a circular region of the pillbox kernel by an area of the circular region, and perform a convolution of the information indication line and the approximated pillbox kernel.

The signal calculator may approximate a circular region of the generated pillbox kernel to a sum of a plurality of rectangular regions, and calculate the sum of the plurality of rectangular regions from sums of an integral image.

The signal calculator may calculate the sum of the plurality of rectangular regions from the sums of the integral image using values at vertices in the integral image.

The signal calculator may perform a convolution of the information indication line and the approximated pillbox kernel, and calculate a parameter minimizing an error function of areas of divided arcs and areas of divided rectangular regions using least-squares optimization.

The highest value enhancement portion may enhance the highest values of the convolution results using a morphological extrema filter (MEF) which is a signal quality improvement filter, and the MEF may be a sparse kernel having a plurality of pairs and is defined as a function of a filter gain and a preset threshold value.

The local highest value extractor may find the local highest values in the enhanced highest values using non-maximum suppression (NMS) with respect to cross sections of the information indication line taken along lines perpendicular to the information indication line and extract a line connecting the local highest values as the salient line connecting the center points in the information indication line.

The local highest value extractor may find the local highest values in the enhanced highest values using the NMS with respect to the cross sections of the information indication line taken along the lines perpendicular to the information indication line, in which values of adjacent pixels or hysterical thresholding employing different threshold values is used.

According to another aspect of the present disclosure, there is provided a method of extracting a salient line for an information sign, the method including: receiving an image including information indication lines to be detected; generating a symmetric function signal consistent with a thickness and a direction of an information indication line having a preset thickness in the received image and performing a convolution of the information indication line and the generated symmetric function signal; enhancing highest values in results of the convolution using a signal quality improvement filter; and finding local highest values among the enhanced highest values and extracting a line connecting the local highest values as a salient line connecting center points in the information indication line.

The performing of the convolution may include generating a disk-shaped symmetric function signal consistent with an arbitrary information indication line having the preset thickness in all directions, and performing a convolution of the information indication line and the generated disk-shaped symmetric function signal.

The performing of the convolution may include generating a pillbox kernel which is a disk-shaped symmetric function defined as a function of image coordinates based on a center of the kernel and a radius of the kernel, and performing a convolution of the information indication line and the generated pillbox kernel.

The performing of the convolution may include approximating the generated pillbox kernel to a value obtained by dividing a sum of image data corresponding to a circular region of the pillbox kernel by an area of the circular region, and performing a convolution of the information indication line and the approximated pillbox kernel.

The performing of the convolution may include approximating a circular region of the generated pillbox kernel to a sum of a plurality of rectangular regions, and calculating the sum of the plurality of rectangular regions from sums of an integral image.

The performing of the convolution may include calculating the sum of the plurality of rectangular regions from the sums of the integral image using values at vertices in the integral image.

The performing of the convolution may include performing a convolution of the information indication line and the approximated pillbox kernel, and calculating a parameter minimizing an error function of areas of divided arcs and areas of divided rectangular regions using least-squares optimization.

The enhancing of the highest values may include enhancing the highest values of the convolution results using an MEF which is a signal quality improvement filter, and the MEF may be a sparse kernel having a plurality of pairs and is defined as a function of a filter gain and a preset threshold value.

The extracting of the salient line may include finding the local highest values in the enhanced highest values using NMS with respect to cross sections of the information indication line taken along lines perpendicular to the information indication line and extracting a line connecting the local highest values as the salient line connecting the center points in the information indication line.

The extracting of the salient line may include finding the local highest values in the enhanced highest values using the NMS with respect to the cross sections of the information indication line taken along the lines perpendicular to the information indication line, in which values of adjacent pixels or hysterical thresholding employing different threshold values is used.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 7 is an example diagram of a morphological extrema filter (MEF) used in a process of enhancing a highest value according to an exemplary embodiment of the present disclosure;

FIG. 8 is an explanatory diagram of a process of detecting a local highest value with reference to values of adjacent pixels according to an exemplary embodiment of the present disclosure;

FIGS. 10A-10B show example diagrams of input images and salient-line extraction results according to an exemplary embodiment of the present disclosure;

DETAILED DESCRIPTION OF EXEMPLARY EMBODIMENTS

Figure 1:
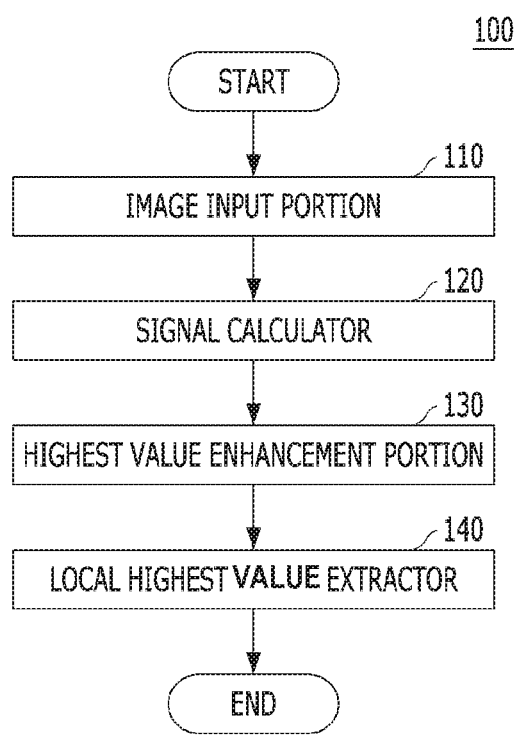
FIG. 1 is a block diagram of an apparatus for extracting a salient line for an information sign according to an exemplary embodiment of the present disclosure.

Hereinafter, exemplary embodiments of the present invention will be described in detail with reference to the accompanying drawings. In the following description of the present invention, a detailed description of known art related to the present invention will be omitted when determined to unnecessarily obscure the subject matter of the present invention. Also, the terms used in the following description are terms defined in consideration of functions in the exemplary embodiments of the present invention and may vary depending on a user's or an operator's intention, practices, or so on. Therefore, definitions of terms used herein should be made based on the content throughout the specification.

In describing components of the present disclosure, components of the same name may be denoted by different reference numerals in the accompanying drawings and may be denoted by the same reference numerals in spite of different drawings. However, even in this case, it does not mean that the corresponding components have different functions according to embodiments or the same function in different embodiments, and functions of each component should be determined based on the description of each component in the corresponding embodiment.

FIG. 1 is a block diagram of an apparatus for extracting a salient line for an information sign according to an exemplary embodiment of the present disclosure.

As shown in FIG. 1, an apparatus 100 for extracting a salient line for an information sign according to an exemplary embodiment of the present disclosure includes an image input portion 110, a signal calculator 120, a highest value enhancement portion 130, and a local highest value extractor 140.

First, most information signs are made up of a set of lines having a particular thickness (referred to as "information indication lines" below), and thus it is preferable to extract only lines constituting the signs.

Therefore, the apparatus 100 for extracting a salient line for an information sign according to an exemplary embodiment of the present disclosure extracts a salient line connecting center points in an information indication line having a thickness within a particular range. According to an exemplary embodiment of the present disclosure, it is possible to extract only information indication lines having a thickness within the particular range from an input image.

These information indication lines are converted into lines having a single-pixel thickness and thus are very effective for subsequent processing. Using the apparatus 100 for extracting a salient line for an information sign according to an exemplary embodiment of the present disclosure, it is possible to effectively perform a region detection operation and a characteristic extraction operation at the same time.

The apparatus 100 for extracting a salient line for an information sign according to an exemplary embodiment of the present disclosure may recognize information signs, such as road markings, traffic signs, guide signs, and so on. The apparatus 100 for extracting a salient line for an information sign may be used in an artificial-intelligence recognition system, such as an autonomous mobile robot, a driverless car, a guide system for the blind, or so on.

Here, most information signs are sets of information indication lines having a particular thickness. The apparatus 100 for extracting a salient line for an information sign according to an exemplary embodiment of the present disclosure may very effectively detect a salient line connecting center points in an information indication line having a particular thickness to detect an information sign. A line connecting center points in an information indication line is defined as a salient line in exemplary embodiments of the present disclosure.

Detailed configurations and operations of the components of the apparatus 100 of FIG. 1 for extracting a salient line for an information sign according to an exemplary embodiment of the present disclosure will be described below.

The image input portion 110 receives an image including an information indication line to be detected.

Then, the signal calculator 120 generates a symmetric function signal consistent with a thickness and a direction of the information indication line having a preset thickness in the image received by the image input portion 110 and performs a convolution of the information indication line and the generated symmetric function signal.

Subsequently, the highest value enhancement portion 130 enhances highest values in results of the convolution performed by the signal calculator 120 using a signal quality improvement filter.

After that, the local highest value extractor 140 finds local highest values among the highest values enhanced by the highest value enhancement portion 130 and extracts a line connecting the local highest values as a salient line connecting center points in the information indication line.

Detailed configurations and operations of the components of the apparatus 100 for extracting a salient line will be described below with reference to FIGS. 2 to 8.

FIGS. 2A-2D are explanatory diagrams of the principle and characteristics of extracting a salient line according to an exemplary embodiment of the present disclosure.

The principle of extracting a salient line according to an exemplary embodiment of the present disclosure will be described with references to FIGS. 2A-2D.

As well known, in the case of a symmetric function, a result of a convolution operation of an input signal and the same signal as the input signal has a highest value at a center point in the signal. This principle is used in the apparatus 100 for extracting a salient line.

As shown in row ① of FIGS. 2A-2D, a cross section of a line having a certain thickness in an input image received by the image input portion 110 may be considered as a symmetric function.

As shown in row ② of FIGS. 2A-2D, the signal calculator 120 generates a symmetric function signal similar to this information indication line to be detected and then performs a convolution of the input signal and the symmetric function signal.

As shown in row ③ of FIGS. 2A-2D a highest value is obtained at a center point in a line that is a result of the convolution of the two signals.

Figure 2A:
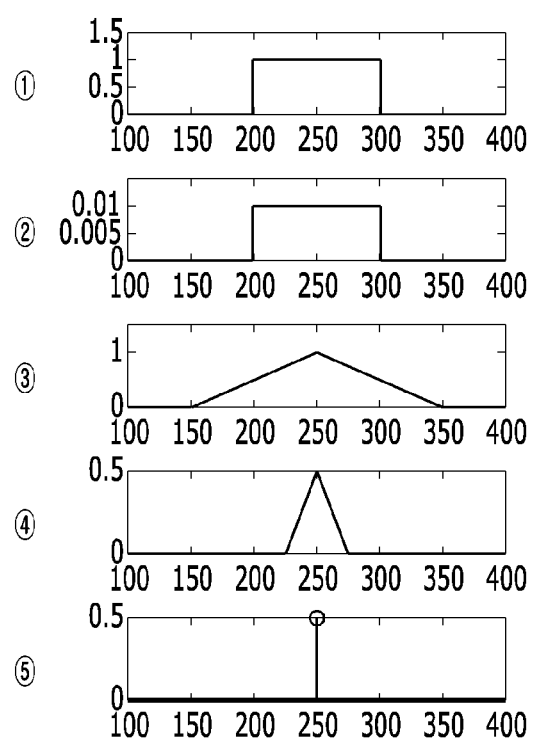
FIGS. 2A-2D are explanatory diagram of the principle and characteristics of extracting a salient line according to an exemplary embodiment of the present disclosure.
Figure 2B:
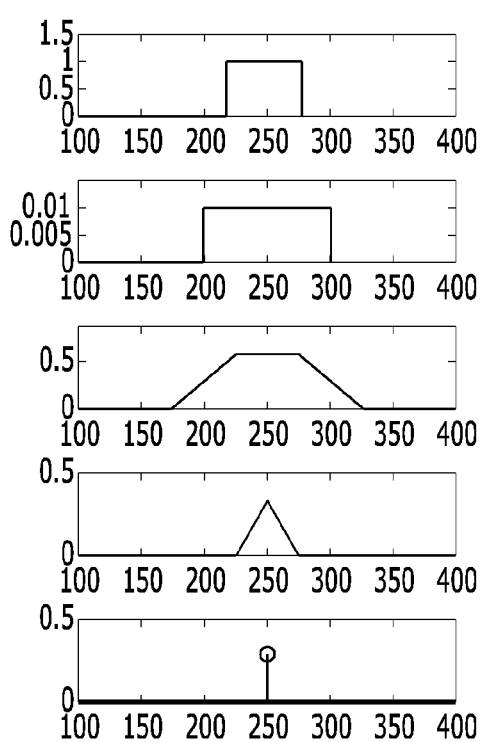
Figure 2C:
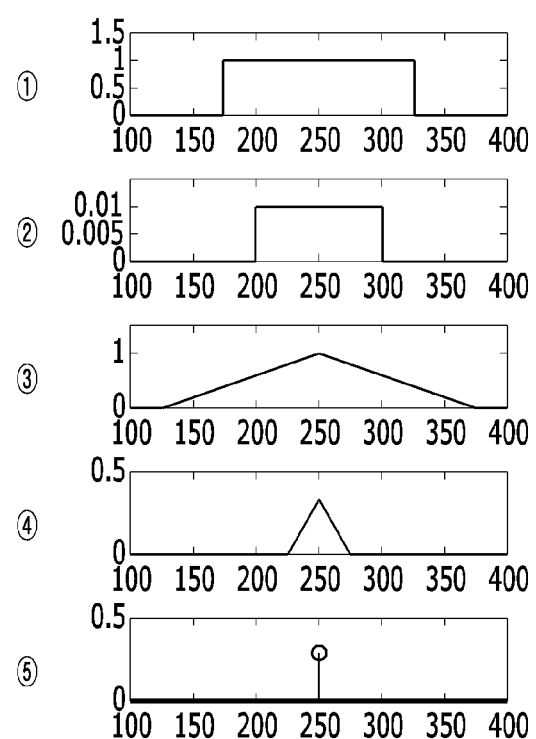

However, as shown in row ③ of FIG. 2B or 2C, when an information indication line to be detected differs from a generated symmetric function signal, it may be difficult to detect a highest value.

As shown in row ④ of FIGS. 2A-2D, the highest value enhancement portion 130 enhances the highest value using a morphological extrema filter (MEF) in a new method for clarifying a highest value.

As shown in row ⑤ of FIGS. 2A-2D, the local highest value extractor 140 may find a local highest value and find a line connecting center points in the information indication line. In this way, the local highest value extractor 140 extracts the salient line connecting the center points in the information indication line.

Figure 2D:
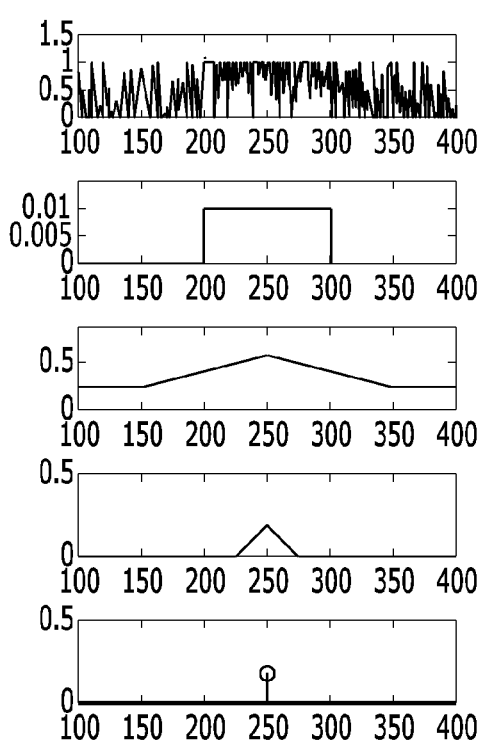

As shown in FIGS. 2B-2D, the apparatus 100 for extracting a salient line according to an exemplary embodiment of the present disclosure may accurately find a desired salient line even when an information indication line to be extracted has a small thickness (e.g., FIG. 2B), a large thickness (e.g., FIG. 2C), or much noise (e.g., FIG. 2D).

Figure 3:
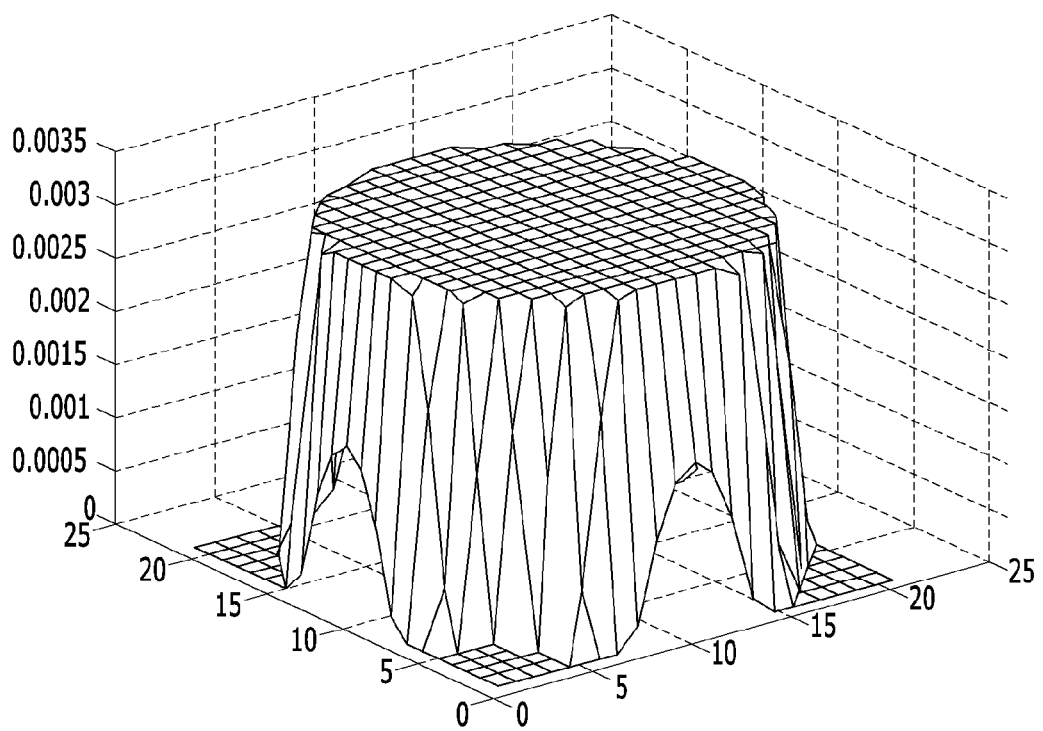
FIG. 3 is an example diagram of a pillbox filter kernel having a radius used in a signal convolution operation process according to an exemplary embodiment of the present disclosure.

FIG. 3 is an example diagram of a pillbox filter kernel having a radius used in a signal convolution operation process according to an exemplary embodiment of the present disclosure.

A pillbox filter kernel having a radius of 10 is shown in FIG. 3 as an example.

First, the signal calculator 120 generates a signal having a thickness and a direction similar to a thickness and a direction of an information indication line to be detected and performs a convolution of the information indication line and the signal.

According to exemplary embodiments of the present invention, this method is more generalized to be applied to an arbitrary information indication line. A signal the most similar to an arbitrary line having a certain thickness in all directions is a circle. Therefore, the signal calculator 120 performs a convolution with a disk-shaped signal.

As an example, during image processing, the signal calculator 120 generates a pillbox kernel which is a disk-shaped kernel and performs a convolution of a signal and the pillbox kernel. The pillbox kernel is defined as shown in [Equation 1] below.

$$K_{pillbox}(u, v) = \begin{cases} \frac{1}{\pi r^2} & \text{if } \sqrt{u^2 + v^2} \leq r, \\ 0 & \text{otherwise.} \end{cases} \quad [\text{Equation 1}]$$

Here, u and v are image coordinates based on the center of the kernel, and r is the radius of the kernel.

In this way, the signal calculator 120 may generate a disk-shaped symmetric function signal that is consistent with an arbitrary information indication line having a preset thickness in all directions, and perform a convolution of the information indication line and the generated disk-shaped symmetric function signal.

Here, the signal calculator 120 may generate a pillbox kernel that is a disk-shaped symmetric function defined with image coordinates based on the center of the kernel and the radius of the kernel and perform a convolution of an information indication line and the generated pillbox kernel.

Figure 4A:
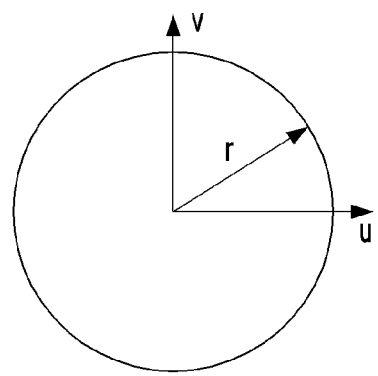
FIGS. 4A-4B are explanatory diagrams of approximation of a pillbox kernel in a signal convolution operation process according to an exemplary embodiment of the present disclosure.
Figure 4B:
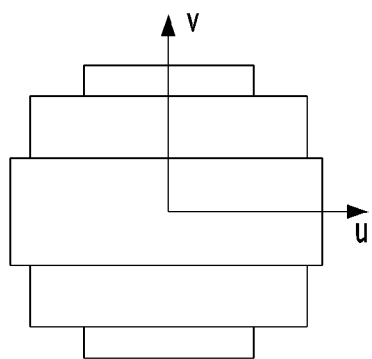

FIGS. 4A-4B are explanatory diagrams of approximation of a pillbox kernel in a signal convolution operation process according to an exemplary embodiment of the present disclosure.

A convolution of a pillbox kernel, as shown in FIGS. 4A-4B, is a function of $O(N^2)$, and the convolution operation requires an amount of calculation proportional to the square of a radius of the pillbox kernel.

Therefore, the signal calculator 120 may approximate the generated pillbox kernel to a value obtained by dividing the sum of image data corresponding to the circular region of the pillbox kernel by the area of the circular region, and perform a convolution of an information indication line and the approximated pillbox kernel, thereby rapidly performing the convolution operation.

As shown in FIG. 4A, for the convolution operation of [Equation 1] above, the signal calculator 120 may approximate a pillbox kernel to a value obtained by dividing the sum of image data corresponding to a circular region by the area of the circular region. In this case, multiplications to be performed for each pixel are reduced.

Meanwhile, as shown in FIG. 4B, the signal calculator 120 may approximate such a circular region to the sum of rectangular regions. At this time, the signal calculator 120 may very effectively calculate the sum of rectangular regions from an integral image which is a function of $O(1)$. In this way, the signal calculator 120 may approximate the circular region of a generated pillbox kernel to the sum of a plurality of rectangular regions and calculate the sum of the plurality of rectangular regions from sums of an integral image.

Here, an integral image is an image processing technology for calculating the sum of pixel values in a region of an image. An integral image I(x,y) at image coordinates (x,y) is calculated as shown in [Equation 2] below.

$$I(x,y)=i(x,y)+I(x-1,y)+I(x,y-1)-I(x-1,y-1) \quad [\text{Equation 2}]$$

Here, i(x,y) is a value at a pair of image coordinates in an input image.

Figure 5:
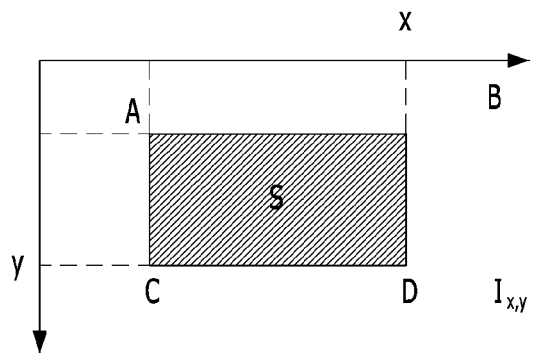
FIG. 5 is an explanatory diagram of the sum of a region in an integral image according to an exemplary embodiment of the present disclosure.

FIG. 5 is an explanatory diagram of the sum of a region in an integral image according to an exemplary embodiment of the present disclosure.

The sum of a region in an integral image may be obtained by a simple calculation as shown in [Equation 3] below.

$$S=D+A-(B+C) \quad [\text{Equation 3}]$$

As shown in FIGS. 5, A, B, C, and D are values at vertices of a rectangular region in an integral image.

In this way, the signal calculator 120 may calculate the sum of a plurality of rectangular regions from sums of an integral image using values at vertices in the integral image.

Figure 6:
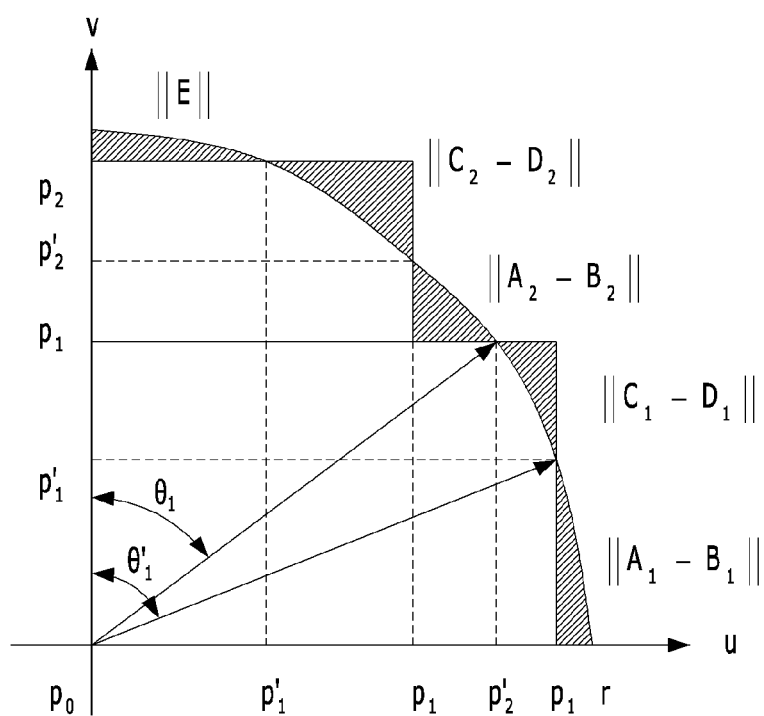
FIG. 6 is an explanatory diagram of the definitions of parameters in a process of selecting a rectangular region according to an exemplary embodiment of the present disclosure.

FIG. 6 is an explanatory diagram of the definitions of parameters in a process of selecting a rectangular region according to an exemplary embodiment of the present disclosure.

A process of selecting an optimal rectangular region will be described with reference to FIG. 6.

A process of defining a parameter in the case of N=2 is shown in FIG. 6. Since a pillbox kernel is symmetrical in all directions based on the center point, the signal calculator 120 divides the pillbox kernel into quarters and defines a minimum number of parameters. As shown in FIG. 6, when a quarter is divided into N rectangular regions, this is expressed as shown in [Equation 4] below.

$$K_{pillbox}(u, v) = \frac{1}{w}\sum_{n=1}^{N} S(u, v) \quad [\text{Equation 4}]$$

Here, w denotes a weight and is the sum of areas of all rectangular regions. S(u,v) is a function for the sum of a rectangular region.

Therefore, a convolution of the pillbox kernel may be approximated as shown in [Equation 5] below.

$$C(x, y) = \frac{1}{w}\sum_{n=1}^{N}\sum_{u=-p_n}^{p_n}\left[\sum_{v=p_{N-n+1}}^{p_{N-n}} i(x + u, y + v) + \sum_{v=-p_{N-n+1}}^{-p_{N-n}} i(x + u, y + v)\right] \quad [\text{Equation 5}]$$

Here, to calculate an optimal parameter $p_n \in \{n|1, \ldots, N\}$, it is necessary to minimize the sum of errors shown as grey regions. This error function may be defined as shown in [Equation 6] below. An optimal value which minimizes the sum of errors may be calculated using a least-squares optimization technique.

In this way, the signal calculator 120 may perform a convolution of an information indication line and an approximated pillbox kernel, and calculate a parameter which minimizes an error function of areas of divided arcs and areas of divided rectangular regions using the least-squares optimization technique as shown in [Equation 6] below.

$$Err = \sum_{n=1}^{N} (\|A_n - B_n\| + \|C_n - D_n\|) + \|E\| \quad \text{[Equation 6]}$$

Here, $A_n$ and $C_n$ are the area of an arc divided by $p_n'$, and $B_n$ and $D_n$ are the area of a rectangular region divided by $p_n'$. These values may be calculated as shown in [Equation 7] below.

$$A_n = \frac{r^2}{4}[(2\theta_{n-2} - \sin 2\theta_{n-1}) - (2\theta_n' - \sin 2\theta_n)] \quad \text{[Equation 7]}$$

$$B_n = p_{N-n+1}(p_n' - p_{n-1})$$

$$C_n = \frac{r^2}{4}[(2\theta_{n-2} - \sin 2\theta_{n-1}) - (2\theta_n' - \sin 2\theta_n)]$$

$$D_n = p_{N-n+1}(p_n' - p_{n-1})$$

$$E = \frac{r^2}{4}(2\theta_N' - \sin 2\theta_N')$$

Here, $p_n' = \sqrt{r^2 - p_{N-n+1}^2}$, $$\theta_n = \cos^{-1}\frac{p_n}{r}, \text{ and } \theta_n' = \cos^{-1}\frac{p_n'}{r}.$$

Optimal parameters calculated in the case of r=1 using [Equation 6] as a cost function according to the least-squares optimization technique are shown in [Table 1] below.

TABLE 1

| N | Optimal parameter | Minimum square error (MSE) |
|---|---|---|
| 2 | 0.616218, 0.938691 | 0.0802 |
| 3 | 0.489959, 0.771291, 0.962032 | 0.0554 |
| 4 | 0.412947, 0.658199, 0.841675, 0.973284 | 0.0423 |

FIG. 7 is an example diagram of an MEF used in a process of enhancing a highest value according to an exemplary embodiment of the present disclosure.

A signal quality improvement filter used in a process of enhancing a highest value will be described.

In an operation of enhancing a highest value, a process for enhancing a highest value in a signal convolution result calculated in a signal calculation operation is performed using a signal quality improvement filter.

As shown in FIG. 7, an MEF may be used as a signal quality improvement filter. The highest value enhancement portion 130 according to an exemplary embodiment of the present disclosure uses an MEF defined as shown in [Equation 8] below. The MEF is a sparse kernel having K pairs and is defined as shown in [Equation 8] below.

$$MEF = \begin{cases} FG & \text{if } FG > TH \\ 0 & \text{otherwise} \end{cases} \quad \text{[Equation 8]}$$

Here, FG is a filter gain, and TH is a threshold value. The FG and TH are defined as shown in [Equation 9] and [Equation 10] below.

$$FG = \max_{0 \le k < K} \{\min[\pm(p_C - p_k), \pm(p_C - p_{K\,k})]\} \quad \text{[Equation 9]}$$

for $p_k = p_C + re^{j(\pi k/K)}, k \in \{0, \cdots, K-1\}$ $$TH = \frac{1}{2}\max\{\max[\pm(p_k - p_C), \pm(p_{K+k} - p_C)]\} \quad \text{[Equation 10]}$$

When MEF processing shown in FIG. 7 is performed, a convolution result is enhanced, and accuracy in detecting a highest value may be improved.

In this way, the highest value enhancement portion 130 may enhance a highest value in an obtained convolution result using an MEF which is a signal quality improvement filter. Here, the MEF is a sparse kernel having a plurality of pairs and may be defined as a function of a filter gain and a preset threshold value.

FIG. 8 is an explanatory diagram of a process of detecting a local highest value with reference to values of adjacent pixels according to an exemplary embodiment of the present disclosure.

The local highest value extractor 140 extracts a local highest value having a directivity.

Data obtained through the previous operations have a ridgeline shape in which the center of the line has the highest value. Therefore, it is preferable to find a highest value in a cross section of a line taken along another line perpendicular to the line. In the process of detecting a local highest value, non-maximum suppression (NMS) may be used for such processing.

According to an example of the present disclosure, as shown in FIG. 8, a local highest value is easily calculated with reference to values of adjacent pixels. When the condition of [Equation 11] is satisfied, the corresponding value is defined as a highest value. There are various methods of calculating NMS, and the present disclosure is not limited to a specific method.

$$NMS = \begin{cases} i_0 & \text{if } \begin{cases} [(i_0 > i_1 \vee i_0 > i_5) \wedge i_1 > i_9 \wedge i_5 > i_{13}] \\ \vee [(i_0 > i_2 \vee i_0 > i_6) \wedge i_2 > i_{10} \wedge i_6 > i_{14}] \\ \vee [(i_0 > i_3 \vee i_0 > i_7) \wedge i_3 > i_{11} \wedge i_7 > i_{15}] \\ \vee [(i_0 > i_4 \vee i_0 > i_8) \wedge i_4 > i_{12} \wedge i_8 > i_{16}] \end{cases} \\ 0 & \text{otherwise} \end{cases} \quad \text{[Equation 11]}$$

According to another example, in the process of extracting a local highest value, a result binarized through hysterical thresholding may be used.

Here, the hysterical thresholding is a binarization method in which two threshold values are used. Assuming that there are two different threshold values, according to the hysterical thresholding, when data equal to or greater than a higher threshold value is found, a region extends to adjacent pixels at which values equal to or greater than a lower threshold value are found.

In this way, the local highest value extractor 140 may find local highest values in enhanced highest values using NMS with respect to cross sections of an information indication line taken along lines perpendicular to the information indication line and extract a line connecting the local highest values as a salient line connecting center points in the information indication line.

At this time, the local highest value extractor 140 may find the local highest values in the enhanced highest values using the NMS with respect to the cross sections of the information indication line taken along the lines perpendicular to the information indication line, in which values of adjacent pixels or hysterical thresholding employing different threshold values is used.

Figure 9:
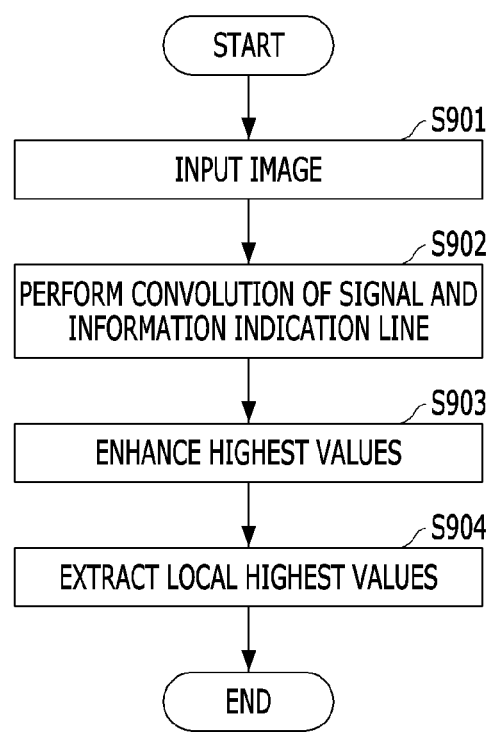
FIG. 9 is a flowchart of a method of extracting a salient line for an information sign according to an exemplary embodiment of the present disclosure.

FIG. 9 is a flowchart of a method of extracting a salient line for an information sign according to an exemplary embodiment of the present disclosure.

A method of extracting a salient line for an information sign according to an exemplary embodiment of the present disclosure is a new method totally different from an existing recognition method for an information sign. In the method of extracting a salient line, only a small amount of calculation is used to directly detect characteristics of a line constituting an information sign existing in an image.

The method of extracting a salient line includes the following three operations. A first operation is to perform a convolution of a line to be detected and a signal similar to the line. A second operation is to use a signal quality improvement filter so that characteristics of the convolution result may be improved. A third operation is to extract local highest values.

The method of extracting a salient line for an information sign illustrated in FIG. 9 will be described.

The image input portion 110 receives an image including information indication lines to be detected (S901).

Then, the signal calculator 120 generates a symmetric function signal consistent with a thickness and a direction of the information indication line having a preset thickness in the image received by the image input portion 110 and performs a convolution of the information indication line and the generated symmetric function signal (S902).

Subsequently, the highest value enhancement portion 130 enhances highest values in results of the convolution performed by the signal calculator 120 using a signal quality improvement filter (S903).

After that, the local highest value extractor 140 finds local highest values among the highest values enhanced by the highest value enhancement portion 130 and extracts a line connecting the local highest values as a salient line connecting center points in the information indication line (S904).

FIGS. 10A-10B show example diagrams of input images and salient-line extraction results according to an exemplary embodiment of the present disclosure.

As results of extracting a salient line according to an exemplary embodiment of the present disclosure, input images and salient-line extraction results are shown in FIGS. 10A-10B, respectively.

In the method of extracting a salient line for an information sign according to an exemplary embodiment of the present disclosure, it is possible to effectively detect a salient line connecting center points in an information indication line having a particular thickness to detect an information sign.

As examples, there are the number "25" and the English word "STOP" having a particular thickness in the input images, as shown in FIG. 10A. In the salient-line extraction results, as shown in FIG. 10B, the number "25," the English word "STOP," and an octagon are extracted as salient lines.

Figure 11:
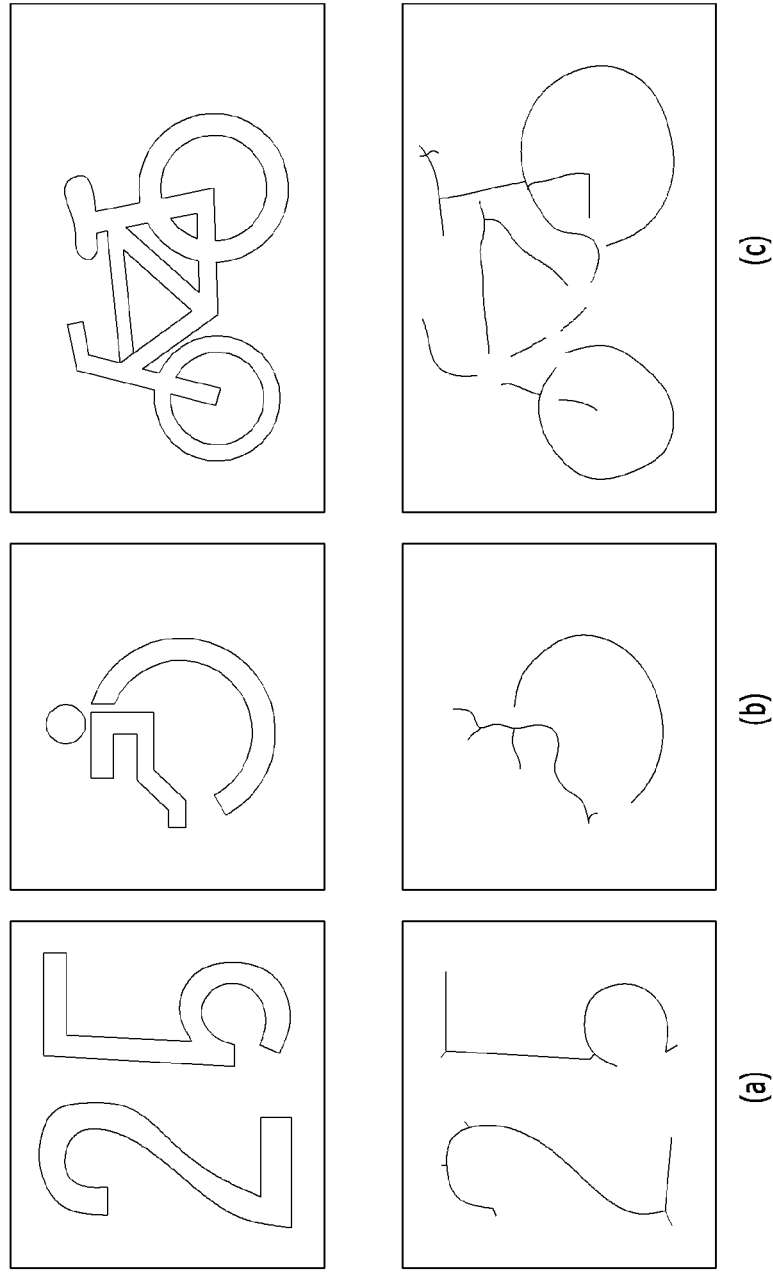
FIGS. 11A-11C show example diagrams of results of extracting salient lines from road markings according to an exemplary embodiment of the present disclosure.

FIGS. 11A-11C show example diagrams of results of extracting salient lines from road markings according to an exemplary embodiment of the present disclosure.

Examples of salient-line extraction results from some road markings are shown in FIGS. 11A-11C.

As shown in FIGS. 11A-11C, the apparatus 100 for extracting a salient line according to an exemplary embodiment of the present disclosure may provide excellent detection results even when a road marking is partially covered by a shadow, spots are generated on a road marking by sunlight, or a road marking is partially damaged and obscured and also includes much noise.

FIGS. 12A-12D show example diagrams of results of detecting salient lines in traffic signs and guide signs according to an exemplary embodiment of the present disclosure.

Examples of salient-line extraction results from some traffic signs and guide signs are shown in FIGS. 12A-12D.

Figure 12:
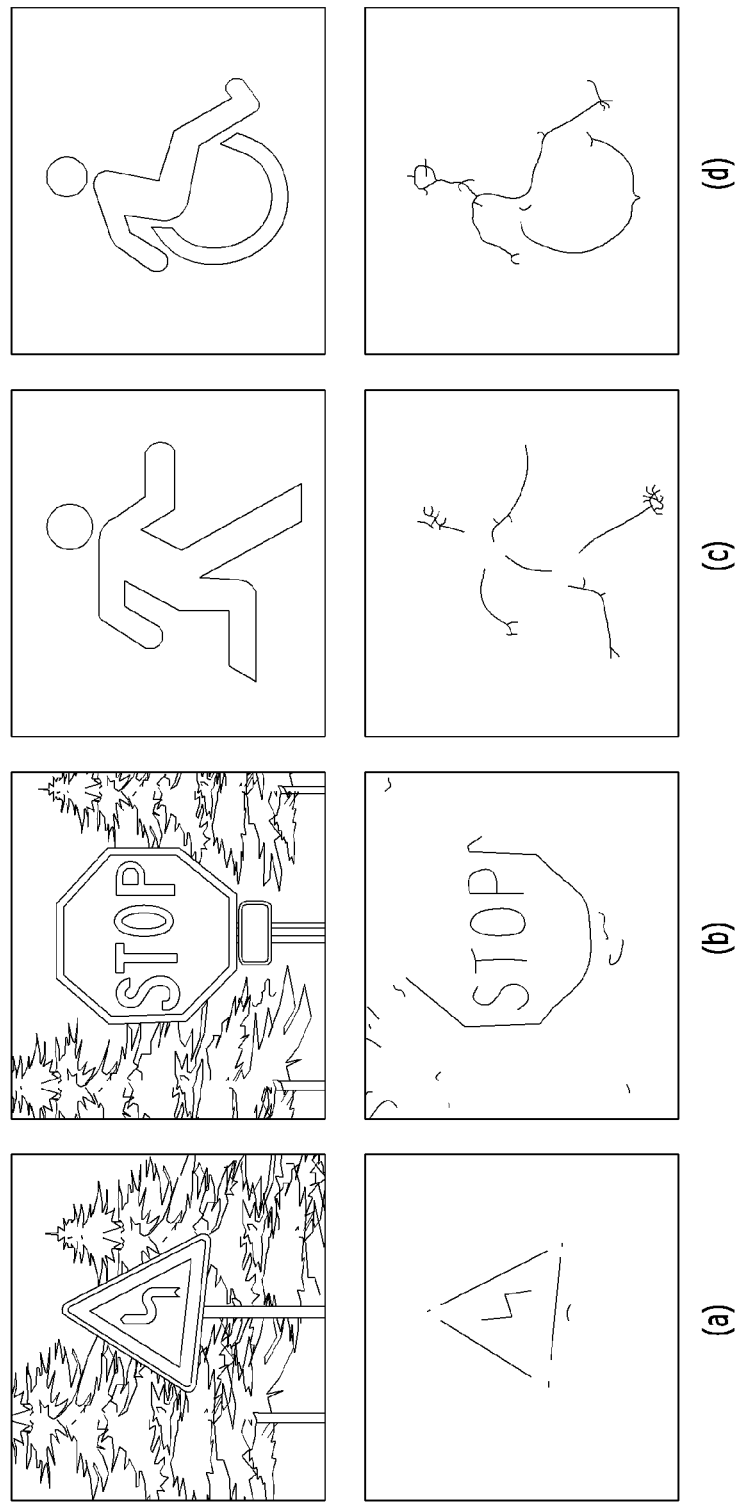
FIGS. 12A-12D show example diagrams of results of detecting salient lines in traffic signs and guide signs according to an exemplary embodiment of the present disclosure.

As shown in FIGS. 12A-12D, the apparatus 100 for extracting a salient line according to an exemplary embodiment of the present disclosure may accurately detect necessary salient lines even in the case where there is a significant difference in thickness between lines (e.g., FIGS. 12C and 12D) as well as the case where there is noise, such as a dense thicket, in the background of a traffic sign or a guide sign (e.g., FIGS. 12A and 12B).

Although it is described above that all components constituting an embodiment of the present invention are combined into one component or operate in combination, the present invention is limited to the described embodiment. In other words, two or more components constituting the embodiment can be selectively combined or operate in combination as long as such combination is within the scope of the present invention. Although each of all components can be implemented as one individual piece of hardware, some or all of the components can be selectively combined to be implemented as a computer program having a program module that performs the combined some or all functions in one or more pieces of hardware. Further, an exemplary embodiment can be implemented by having the computer program stored in computer-readable media, such as universal serial bus (USB) memory, a compact disc read only memory (CD-ROM), a flash memory, etc., and read and executed by a computer. The computer-readable media can also include magnetic recording media, optical recording media, carrier wave media, and so on.

According to exemplary embodiments of the present disclosure, it is possible to extract a salient line for an information sign at a high speed in a way robust to noise such that the exemplary embodiments may be used in a robot, an auxiliary device for safe driving, etc. having low computational capability.

Also, according to exemplary embodiments of the present disclosure, all salient information indication lines existing in an input image are extracted through a single calculation, and thus it is possible to detect characteristics (a salient line) of an information sign remarkably rapidly compared to an existing method of recognizing an information sign.

Also, exemplary embodiments of the present disclosure may be very robust to noise and a change in the thickness of an information indication line for an information sign.

Also, exemplary embodiments of the present disclosure may be very advantageous for parallel processing because there is no causal relationship between pieces of data for extracting a salient line.

Also, according to exemplary embodiments of the present disclosure, an existing pre-recognition calculation operation including a region detection operation and a characteristic extraction operation may be performed as a single operation, that is, salient line extraction.

Also, according to exemplary embodiments of the present disclosure, it is possible to detect characteristics of lines constituting an information sign with a very small amount of calculation.

Also, a salient line detected according to exemplary embodiments of the present disclosure may be very usefully used as a line having a single-pixel thickness in a subsequent recognition process.

Further, according to exemplary embodiments of the present disclosure, it is possible to detect a line having a single-pixel thickness with a small amount of calculation, unlike an existing thinning technique which involves a large amount of calculation.

According to exemplary embodiments of the present disclosure, even when it is very difficult to detect an information sign, it is possible to effectively detect an information sign. More specifically, according to exemplary embodiments of the present disclosure, it is possible to accurately find the center of a line even when there is a change in brightness, a change in the thickness of the line, or much noise.

Moreover, exemplary embodiments of the present disclosure may be used in all fields of a driverless car, service robot, guide device for the blind, etc. in which it is necessary to recognize an information sign.

The above description of the present invention is exemplary, and those of ordinary skill in the art will appreciate that the present invention can be easily carried out in other detailed forms without departing from the technical spirit or essential characteristics of the present invention. Therefore, it should be noted that the exemplary embodiments described above are exemplary in all aspects and are not restrictive. For example, each component described to be a single type can be implemented in a distributed manner. Likewise, components described to be distributed can be implemented in a combined manner.

It is also noted that the scope of the present invention is defined by the claims rather than the description of the present invention, and the meanings and ranges of the claims and all modifications derived from the concept of equivalents fall within the scope of the present invention.

What is claimed is:

1. An apparatus for extracting a salient line for an information sign, the apparatus comprising:
   one or more processors that process computer executable program code embodied in non-transitory computer readable storage media, the computer executable program code comprising:
   image input portion program code that receives an image including information indication lines to be detected;
   signal calculator program code that generates a symmetric function signal consistent with a thickness and a direction of an information indication line having a preset thickness in the received image and that performs a convolution of the information indication line and the generated symmetric function signal;
   value enhancement portion program code that enhances values in results of the convolution using a signal quality improvement filter; and
   local value extractor program code that finds local values among the enhanced hi values and that extracts a line connecting the local values as a salient line connecting center points in the information indication line.

2. The apparatus of claim 1, wherein the signal calculator program code generates a disk-shaped symmetric function signal consistent with an arbitrary information indication line having the preset thickness in all directions, and performs a convolution of the information indication line and the generated disk-shaped symmetric function signal.

3. The apparatus of claim 1, wherein the signal calculator program code generates a pillbox kernel which is a disk-shaped symmetric function defined as a function of image coordinates based on a center of the pillbox kernel and a radius of the pillbox kernel, and performs a convolution of the information indication line and the generated pillbox kernel.

4. The apparatus of claim 3, wherein the signal calculator program code approximates the generated pillbox kernel to a value obtained by dividing a sum of image data corresponding to a circular region of the pillbox kernel by an area of the circular region, and performs a convolution of the information indication line and the approximated pillbox kernel.

5. The apparatus of claim 3, wherein the signal calculator program code approximates a circular region of the generated pillbox kernel to a sum of a plurality of rectangular regions, and calculates the sum of the plurality of rectangular regions from sums of an integral image.

6. The apparatus of claim 5, wherein the signal calculator program code calculates the sum of the plurality of rectangular regions from the sums of the integral image using values at vertices in the integral image.

7. The apparatus of claim 5, wherein the signal calculator program code performs a convolution of the information indication line and the approximated pillbox kernel, and calculates a parameter minimizing an error function of areas of divided arcs and areas of divided rectangular regions using least-squares optimization.

8. The apparatus of claim 1, wherein the value enhancement portion program code enhances the values of the convolution results using a morphological extrema filter (MEF) which is a signal quality improvement filter, and the MEF is a sparse kernel having a plurality of pairs and is defined as a function of a filter gain and a preset threshold value.

9. The apparatus of claim 1, wherein the local value extractor program code finds the local values in the enhanced values using non-maximum suppression (NMS) with respect to cross sections of the information indication line taken along lines perpendicular to the information indication line and extracts a line connecting the local values as the salient line connecting the center points in the information indication line.

10. The apparatus of claim 9, wherein the local value extractor program code finds the local values in the enhanced values using the NMS with respect to the cross sections of the information indication line taken along the lines perpendicular to the information indication line, in which values of adjacent pixels or hysterical thresholding employing different threshold values is used.

11. A method of extracting a salient line for an information sign, the method comprising:
   processing computer executable program code embodied in non-transitory computer readable storage media by one or more processors, the computer executable program code comprising:
   program code that receives an image including information indication lines to be detected;
   program code that generates a symmetric function signal consistent with a thickness and a direction of an information indication line having a preset thickness in the received image and that performs a convolution of the information indication line and the generated symmetric function signal;

program code that enhances values in results of the convolution using a signal quality improvement filter; and program code that finds local values among the enhanced values and that extracts a line connecting the local values as a salient line connecting center points in the information indication line.

12. The method of claim 11, wherein the program code that performs the convolution includes program code that generates a disk-shaped symmetric function signal consistent with an arbitrary information indication line having the preset thickness in all directions, and that performs a convolution of the information indication line and the generated disk-shaped symmetric function signal.

13. The method of claim 11, wherein the program code that performs the convolution includes program code that generates a pillbox kernel which is a disk-shaped symmetric function defined as a function of image coordinates based on a center of the kernel and a radius of the kernel, and that performs a convolution of the information indication line and the generated pillbox kernel.

14. The method of claim 13, wherein the program code that performs the convolution includes program code that approximates the generated pillbox kernel to a value obtained by dividing a sum of image data corresponding to a circular region of the pillbox kernel by an area of the circular region, and that performs a convolution of the information indication line and the approximated pillbox kernel.

15. The method of claim 13, wherein the program code that performs the convolution includes program code that approximates a circular region of the generated pillbox kernel to a sum of a plurality of rectangular regions, and that calculates the sum of the plurality of rectangular regions from sums of an integral image.

16. The method of claim 15, wherein the program code that performs the convolution includes program code that calculates the sum of the plurality of rectangular regions from the sums of the integral image using values at vertices in the integral image.

17. The method of claim 15, wherein the program code that the convolution includes program code that performs a convolution of the information indication line and the approximated pillbox kernel, and that calculates a parameter minimizing an error function of areas of divided arcs and areas of divided rectangular regions using least-squares optimization.

18. The method of claim 11, wherein the program code that enhances the values includes program code that enhances the values of the convolution results using a morphological extrema filter (MEF) which is a signal quality improvement filter, and the MEF is a sparse kernel having a plurality of pairs and is defined as a function of a filter gain and a preset threshold value.

19. The method of claim 11, wherein the program code that extracts the salient line includes program code that finds the local values in the enhanced values using non-maximum suppression (NMS) with respect to cross sections of the information indication line taken along lines perpendicular to the information indication line and that extracts a line connecting the local values as the salient line connecting the center points in the information indication line.

20. The method of claim 19, wherein the program code that extracts the salient line includes program code that finds the local values in the enhanced values using the NMS with respect to the cross sections of the information indication line taken along the lines perpendicular to the information indication line, in which values of adjacent pixels or hysterical thresholding employing different threshold values is used.

* * * * *